United States Patent
Liao et al.

(10) Patent No.: US 10,327,027 B2
(45) Date of Patent: Jun. 18, 2019

(54) METHODS FOR SCREENCASTING AND SYSTEMS AND APPARATUSES USING THE SAME

(71) Applicant: Wistron Corp., New Taipei (TW)

(72) Inventors: Fang-Wen Liao, New Taipei (TW); Ping-Hung Chen, New Taipei (TW); Pen-Tai Miao, New Taipei (TW)

(73) Assignee: WISTRON CORP., New Taipei (TW)

( * ) Notice: Subject to any disclaimer, the term of this patent is extended or adjusted under 35 U.S.C. 154(b) by 39 days.

(21) Appl. No.: 14/574,657

(22) Filed: Dec. 18, 2014

(65) Prior Publication Data

US 2015/0373389 A1  Dec. 24, 2015

(30) Foreign Application Priority Data

Jun. 18, 2014  (TW) .............................. 103120980 A (51) Int. Cl.
*G06F 3/00* (2006.01)
*H04N 21/2743* (2011.01)
(Continued)

(52) U.S. Cl.
CPC ....... *H04N 21/2743* (2013.01); *G06F 3/1454* (2013.01); *G06F 9/452* (2018.02);
(Continued)

(58) Field of Classification Search
None
See application file for complete search history.

(56) References Cited

U.S. PATENT DOCUMENTS 5,649,104 A * 7/1997 Carleton ................. G06F 3/038
348/E7.083
8,958,018 B2 * 2/2015 Sibilsky .................. G06F 3/033
345/2.3
(Continued)

FOREIGN PATENT DOCUMENTS

TW  200415920  8/2004
TW  201317879  5/2013

OTHER PUBLICATIONS

Chinese language office action dated Nov. 11, 2015, issued in application No. TW 103120980.
(Continued)

*Primary Examiner* — Jefferey F Harold
*Assistant Examiner* — Humam M Satti
(74) *Attorney, Agent, or Firm* — McClure, Qualey & Rodack, LLP (57) ABSTRACT

The invention introduces a screencasting method, executed by a processing unit of a screencasting source, which contains at least the following steps. After the screencasting source connects to a screencasting receiver, a first screen image displayed on a display unit of the screencasting source is captured. Then, the first screen image and display area information of a first input component of the first screen image is transmitted to the screencasting receiver, thereby enabling the screencasting receiver to render a second screen image according to the first screen image and the display area information, where the second screen image contains at least a second input component including at least an input string.

18 Claims, 9 Drawing Sheets

(51) Int. Cl.
*H04N 21/4223* (2011.01)
*H04N 21/4402* (2011.01)
*H04N 21/41* (2011.01)
*G06F 9/54* (2006.01)
*G06F 9/451* (2018.01)
*G06F 3/14* (2006.01)

(52) U.S. Cl.
CPC ............ *G06F 9/54* (2013.01); *H04N 21/4126* (2013.01); *H04N 21/4223* (2013.01); *H04N 21/440218* (2013.01)

(56) References Cited

U.S. PATENT DOCUMENTS

| | | | | |
|---|---|---|---|---|
| 9,035,896 | B2* | 5/2015 | Nagahara | H04L 12/1813 345/173 |
| 9,065,876 | B2* | 6/2015 | Huang et al. | |
| 2006/0123141 | A1* | 6/2006 | Pinedo | G06F 3/0481 710/5 |
| 2006/0259553 | A1 | 11/2006 | Kawakita | |
| 2008/0195762 | A1* | 8/2008 | Wood | G06F 3/0231 710/1 |
| 2010/0037151 | A1* | 2/2010 | Ackerman | G06Q 10/10 715/753 |
| 2011/0187722 | A1* | 8/2011 | Na | G06T 11/60 345/467 |
| 2012/0200489 | A1* | 8/2012 | Miyashita | G06F 3/0233 345/156 |
| 2012/0260198 | A1* | 10/2012 | Choi | G06F 3/048 715/761 |
| 2012/0284606 | A1* | 11/2012 | Sitrick | G06Q 10/101 715/232 |
| 2013/0086487 | A1* | 4/2013 | Findlay | H04N 7/15 715/753 |
| 2013/0138726 | A1* | 5/2013 | Shin | H04L 29/08 709/203 |
| 2013/0138728 | A1* | 5/2013 | Kim | G06F 15/16 709/203 |
| 2013/0181898 | A1 | 7/2013 | Liu | |
| 2013/0227014 | A1* | 8/2013 | Song | H04L 67/025 709/204 |
| 2013/0246665 | A1* | 9/2013 | Lee et al. | 710/11 |
| 2013/0304794 | A1* | 11/2013 | Verma et al. | 709/201 |
| 2014/0009394 | A1* | 1/2014 | Lee et al. | 345/157 |
| 2014/0130101 | A1* | 5/2014 | Yoshitani | H04N 21/4126 725/52 |
| 2014/0359650 | A1* | 12/2014 | Ohtake | H04N 21/42208 725/25 |
| 2015/0067549 | A1* | 3/2015 | Chang et al. | 715/761 |
| 2015/0104144 | A1* | 4/2015 | Minemura | H04L 65/1069 386/230 |
| 2015/0120817 | A1* | 4/2015 | Jeong | G06F 1/1454 709/203 |
| 2015/0179143 | A1* | 6/2015 | Subramaniam | H04L 67/025 345/2.3 |
| 2015/0271431 | A1* | 9/2015 | Miao | H04N 5/93 386/230 |
| 2015/0370342 | A1* | 12/2015 | Nomura | G06F 17/21 715/761 |
| 2016/0364200 | A1* | 12/2016 | Beveridge | G06F 3/1454 |

OTHER PUBLICATIONS

English language translation of relevant paragraphs of office action.

* cited by examiner

METHODS FOR SCREENCASTING AND SYSTEMS AND APPARATUSES USING THE SAME

CROSS REFERENCE TO RELATED APPLICATIONS

This Application claims priority of Taiwan Patent Application No. 103120980, filed on Jun. 18, 2014, the entirety of which is incorporated by reference herein.

BACKGROUND

Technical Field

The present invention relates to a screencasting, and in particular to methods for screencasting and systems and apparatuses using the same.

Description of the Related Art

Screencasting technology could deliver video data to or from desktop computers, tablet computers, mobile phones, and other devices by wired or wireless way. It allows users to, for example, duplicate image of display from a mobile phone or a tablet computer onto a television, or share a laptop screen with the conference room projector in real-time. Both the sending and receiving devices must support screencasting for the technology to work. The sending device, also referred to as the screencasting source, provides the duplicated computer screen to the receiving device, also referred to as the screencasting sink, to display. Users may input messages via an input device, such as a keyboard or a keypad, equipped in the receiving device. Typically, the input message cannot be updated on the display of the receiving device directly. The receiving device needs to transmit the input messages to the sending device to force the sending device to update its computer screen, and then the sending device provides the updated computer screen to the receiving device to display. However, the aforementioned message interchanges delay the computer screen update of the receiving device. Thus, it is desirable to have methods for screencasting and systems and apparatuses using the same to address the aforementioned drawbacks.

BRIEF SUMMARY

An embodiment of the invention introduces a screencasting method, executed by a processing unit of a screencasting source, which contains at least the following steps. After the screencasting source connects to a screencasting receiver, a first screen image displayed on a display unit of the screencasting source is captured. Then, the first screen image and display area information of a first input component of the first screen image is transmitted to the screencasting receiver, thereby enabling the screencasting receiver to render a second screen image according to the first screen image and the display area information, where the second screen image comprises a second input component comprising an input string.

Another embodiment of the invention introduces a screencasting method, executed by a processing unit of a screencasting receiver, which contains at least the following steps. After the screencasting receiver connects to a screencasting source, a first screen image displayed on a first display unit of the screencasting source, and display area information of a first input component of the first screen image, are received from the screencasting source. Then, a string inputted by a user with an input device of the screencasting receiver is obtained, and is combined into a second input component. The second input component is combined into the first screen image to generate a second screen image according to the display area information, and the second screen image is rendered on a second display unit of the screencasting receiver.

Still another embodiment of the invention introduces a screencasting system, which contains at least a screencasting source. The screencasting source contains at least a first display unit and a first processing unit. The first display unit displays a first screen image. After the screencasting source connects to a screencasting receiver, the first processing unit captures the first screen image and transmits the first screen image and display area information of a first input component of the first screen image to the screencasting receiver, thereby enabling the screencasting receiver to render a second screen image according to the first screen image and the display area information, where the second screen image comprises a second input component comprising an input string.

The other embodiment of the invention introduces a screencasting apparatus, operating as a screencasting receiver, which contains at least a first display unit, an input device and a processing unit. After the screencasting receiver connects to a screencasting source, the processing unit receives a first screen image displayed on a second display unit of the screencasting source and display area information of a first input component of the first screen image from the screencasting source, obtains a string inputted by a user with the input device, combines the string into a second input component, combines the second input component into the first screen image to generate a second screen image according to the display area information, and renders the second screen image on the first display unit.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
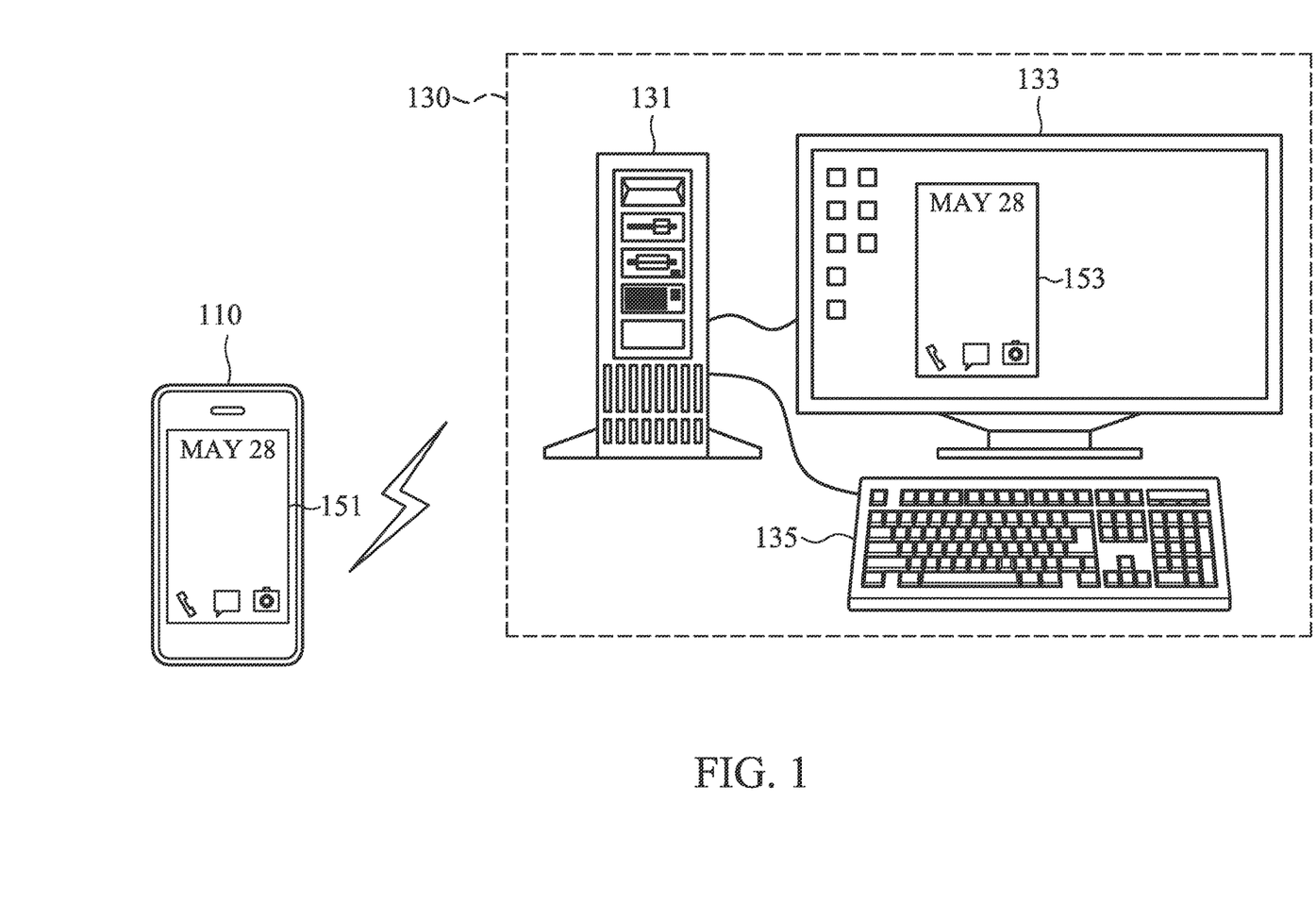
FIG. 1 illustrates the system architecture of the screencasting process according to an embodiment of the invention.

Embodiments of the invention are operated in the screencasting system. FIG. 1 illustrates the system architecture of the screencasting process according to an embodiment of the invention, containing a mobile phone 110 and a desktop computer 130. The desktop computer may contain a host unit 131, a display device 133 and a keyboard 135. Either the mobile phone 110 or the display device 133 includes a display panel, such as a TFT-LCD (Thin film transistor liquid-crystal display) panel, or an OLED (Organic Light-Emitting Diode) panel, to display input letters, alphanumeric characters and symbols, dragged paths, drawings, or screens provided by an application for the user to view. The mobile phone 110 may employ a wireless communications technology, such as the Wi-Fi Connect®, Bluetooth®, etc., to connect to the desktop computer 130, and use a screencasting technology, such as the Miracast®, etc., to duplicate the display 151 onto a region 153 of the display device 133. The mobile phone 110 may be referred to as a screencasting source while the desktop computer 130 may be referred to as a screencasting receiver. The mobile phone 110 and the desktop computer 130 may run on different OSs (Operating Systems), for example the mobile phone 110 may run on Google® Android® while the desktop computer may operate in Microsoft® Windows®. Although a screencasting source is shown in the embodiments as the mobile phone 110, it should be understood that alternative embodiments are contemplated, such as providing a portable device like a tablet computer, a notebook computer, etc., as a screencasting source. Although a screencasting receiver is shown in the embodiments as the desktop computer 130, it should be understood that alternative embodiments are contemplated, such as providing a computer apparatus with a larger display, like a tablet computer, a notebook computer, etc., as a screencasting receiver. The connection between the screencasting source and receiver is not limited to wireless communications, it is also feasible to connect therebetween with wired cables, and the invention should not be limited thereto.

Figure 2:
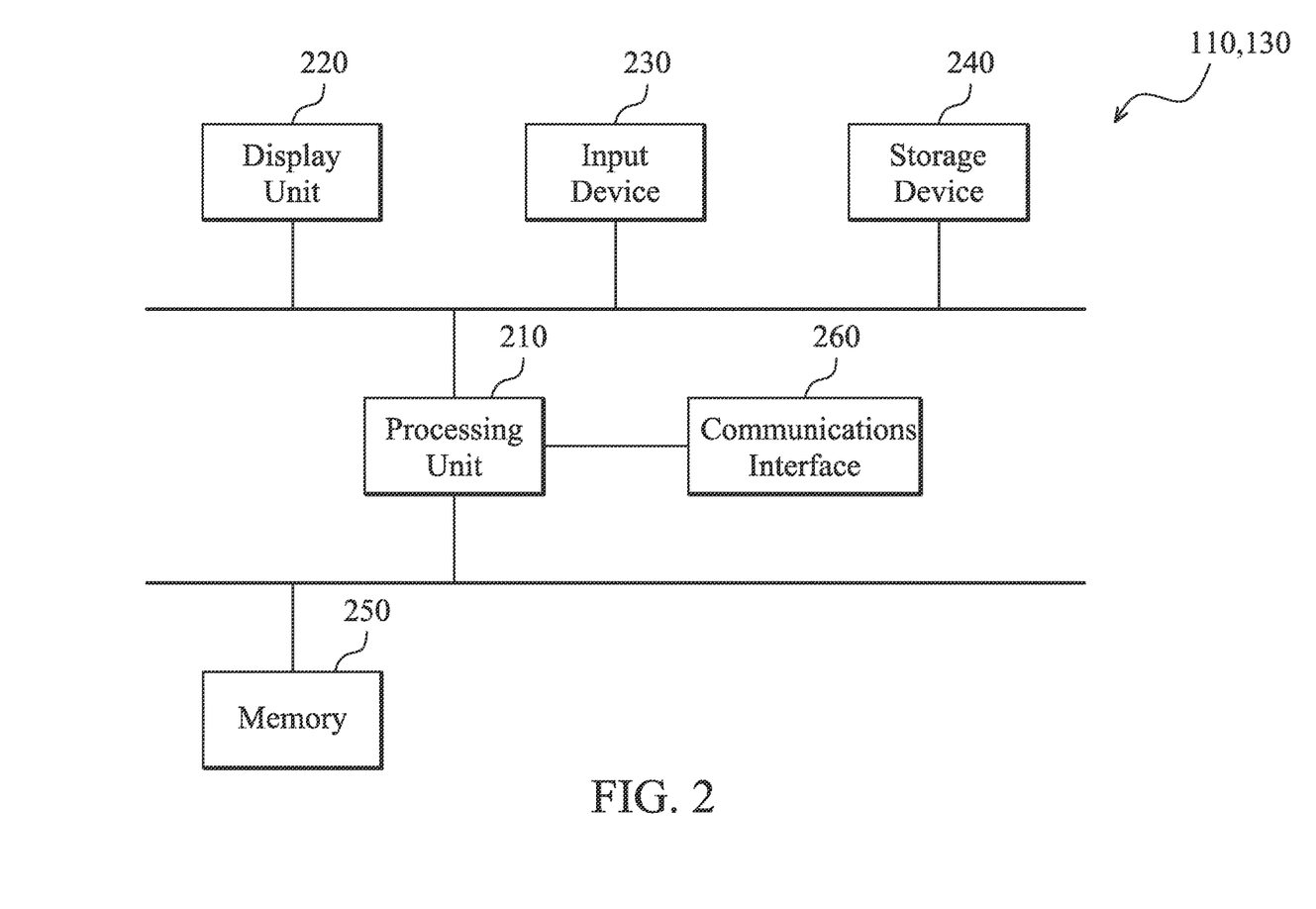
FIG. 2 is the system architecture of an electronic device according to an embodiment of the invention.

FIG. 2 is the system architecture of an electronic device according to an embodiment of the invention. The system architecture may be practiced in the mobile phone 110, the desktop computer 130 or another electronic device with computation capability. A processing unit 210 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The system architecture further includes a memory 250 for storing necessary data in execution, such as variables, data tables, etc., and a storage device 240 for storing a wide range of electronic files, such as Web pages, documents, video files, audio files, etc. A communications interface 260 is included in the system architecture and the processing unit 210 can thereby communicate with another electronic device. An input device 230 may include a touch panel to help a user to make a gesture to control a running application. The gestures include, but are not limited to, a single-click, a double-click, a single-finger dragging, and a multiple finger dragging. The input device 230 may further include a keyboard, a keypad, a mouse, etc. A display unit 220 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view.

Figure 3:
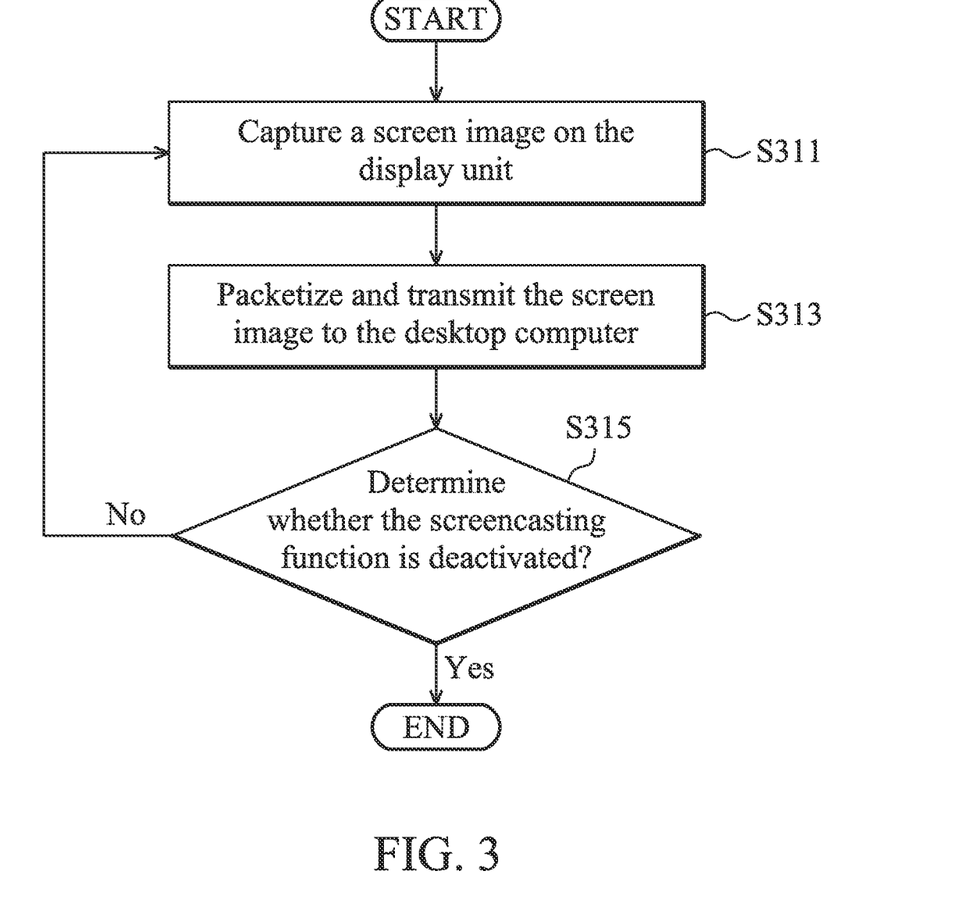
FIG. 3 is a flowchart illustrating a method for transmitting screen images, performed by a processing unit of a mobile phone according to an embodiment of the invention.

FIG. 3 is a flowchart illustrating a method for transmitting screen images, performed by the processing unit 210 of the mobile phone 110 according to an embodiment of the invention. The method is periodically performed when the mobile phone 110 connects to the desktop computer 130 and activates the screencasting function. The method is implemented in a main thread of the screencasting source, which is created and executed by the processing unit 210 when the screencasting function is activated. Loop is performed periodically, for example, 40 times per second, until the screencasting function is deactivated. In each run, the processing unit 210 captures a screen image on the display unit 220 (step S311), packetizes and transmits the screen image to the desktop computer 130 (step S313), and determines whether the screencasting function is deactivated (step S315). When the screencasting function is activated (the "no" path of step S315), the processing unit 210 continues the next run of operations; otherwise (the "yes" path of step S315), the whole process ends. In step S311, the screen image may be a compressed image, such as a JPEG (Joint Photographic Experts Group) image, or an uncompressed image. In step S313, the screen image may be packetized into UDP (User Datagram Protocol) packets, and the UDP packets are transmitted to the desktop computer 130 in a wired or wireless communications protocol. In step S315, the screencasting function is determined to be deactivated when the mobile phone 110 is disconnected from the desktop computer 130 or the screencasting function is closed by a user.

Figure 4:
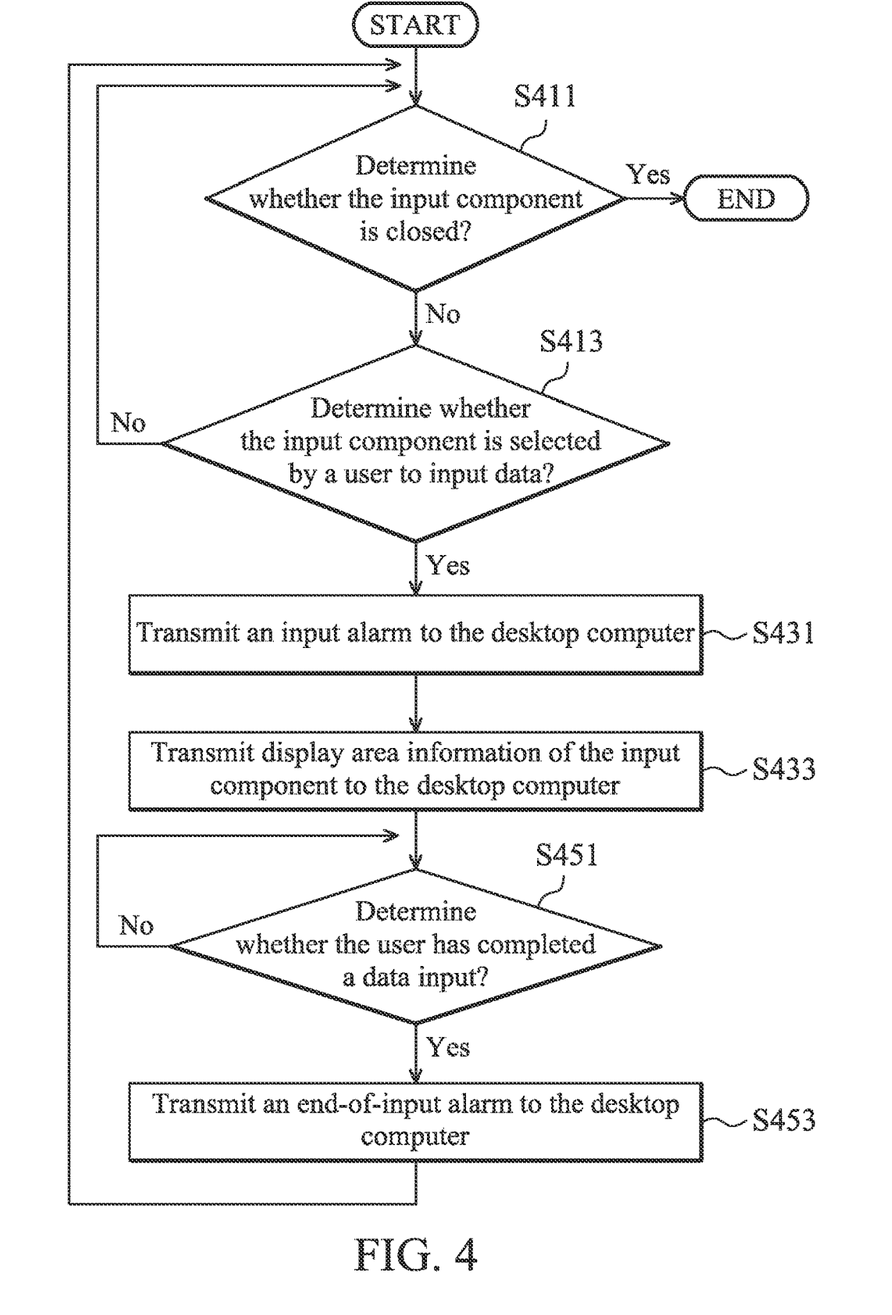
FIG. 4 is a flowchart illustrating a method for transmitting input component information, performed by a processing unit of a mobile phone according to an embodiment of the invention.
Figure 5:
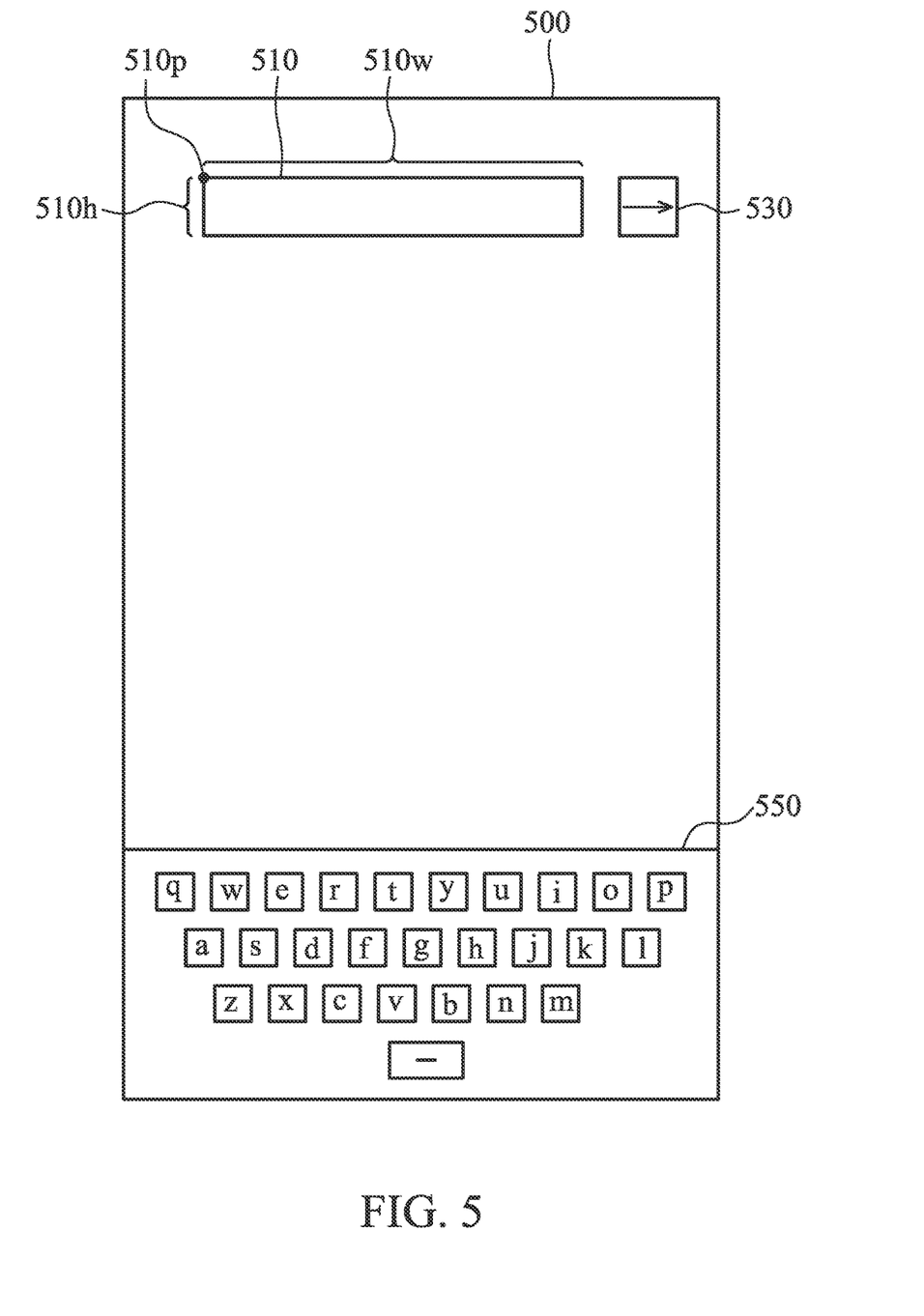
FIG. 5 shows a screen image according to an embodiment of the invention.

FIG. 4 is a flowchart illustrating a method for transmitting input component information, performed by the processing unit 210 of the mobile phone 110 according to an embodiment of the invention. The method is implemented in an input component thread of the screencasting source, which is created and executed by the processing unit 210 when an application including an input component is initiated. The input component may be an input box to help a user to input a network address, a search string, a text message, etc. FIG. 5 shows a screen image according to an embodiment of the invention. A screen image 500 is displayed on the display unit 220 of the mobile phone 110, including an input box 510, a submit button 530 and a virtual keyboard 550. First, the processing unit 210 periodically determines whether the input component is closed (step S411) and determines whether the input component is selected by a user to input data (step S413). When it is determined that the input component is closed (the "yes" path of step S411), the whole process ends. When it is determined that the input component is selected by a user to input data (the "yes" path of step S413), relevant input operations are performed (steps S431 to S453); otherwise (the "no" path of step S413), the next run of the determinations is performed. In step S411, for example, it is determined that the input component is closed when the application containing the input box 510 is terminated. In step S413, for example, it is determined that the input component is selected for data input when the input box 510 is clicked by the user.

After it is determined that the input component is selected by the user for data input (the "yes" path of step S413), an input alarm is transmitted to the desk top computer 130 to indicate that the user will input data (step S431), and display area information of the input component is transmitted to the desktop computer 130, enabling the desktop computer 130 to anticipate where the input component is situated in the screen image (step S433). For example, the display area information may contain a start coordinate 510*p* of the input box 510 (i.e. the coordinate of the upper-left corner), a width 510*w* and a height 510*h*. Subsequently, the processing unit 210 periodically determines whether the user has completed a data input (step S451). If so (the "yes" path of step S451), an end-of-input alarm is transmitted to the desktop computer 130 to indicate that the user has completed data input (S453); otherwise (the "no" path of step S451), the next run of the determinations is performed. In step S451, for example, it is determined that the user completes the data input when the submit button 530 is clicked. It should be noted that the input alarm in step S431 and the end-of-input alarm in step S451 may be carried in the UDP packets and transmitted to the desktop computer 130 in a wired or wireless communications protocol.

Figure 6:
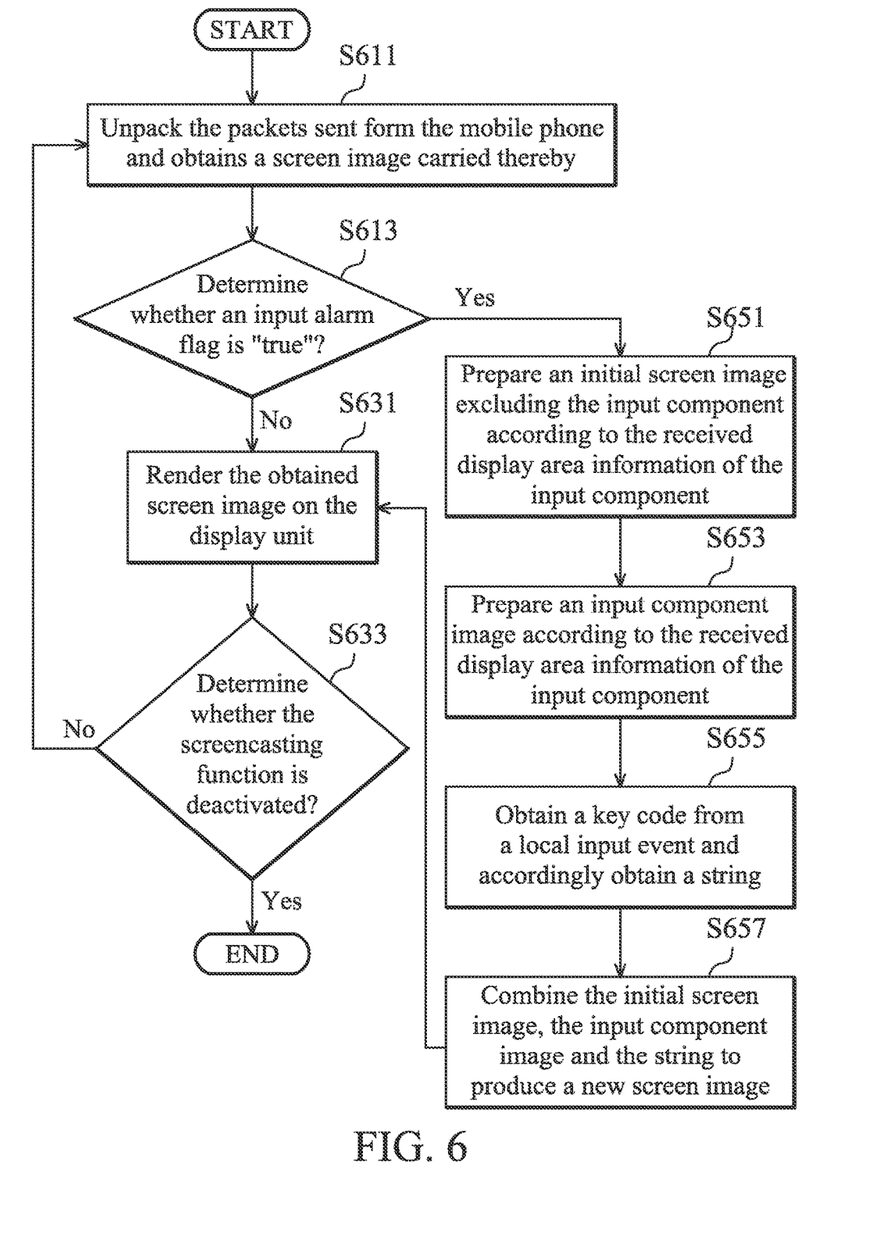
FIG. 6 is a flowchart illustrating a method for rendering screen images, performed by a processing unit of a desktop computer according to an embodiment of the invention.

FIG. 6 is a flowchart illustrating a method for rendering screen images, performed by the processing unit 210 of the desktop computer 130 according to an embodiment of the invention. The method is periodically performed when the mobile phone 110 connects to the desktop computer 130 and activates the screencasting function. The method is implemented in a main thread of the screencasting receiver, which is created and executed by the processing unit 210 when the screencasting function is activated. A periodically performed loop is included in the method, for example, 40 times per second, until the screencasting function is deactivated. In each run, the processing unit 210 unpacks the packets sent from the mobile phone 110 and obtains a screen image carried thereby (step S611), and determines whether an input alarm flag is "true" (step S613). Technical details for transmitting screen images by the mobile phone 110 may refer to the description of step S313. In step S613, the input flag being of "true" indicates that the user is inputting letters, alphanumeric characters or symbols in the input component of the screen of the mobile phone 110. Technical details for setting the input alarm flag will be described in the following paragraphs. When the input alarm flag is "false" (the "no" path of step S613), the obtained screen image is rendered on the display unit 220 (i.e. the display device 133) (step S631). In step S631, because the user is not inputting anything, the processing unit 210 directly renders the obtained screen image on the display unit 220 without further operations to the obtained screen image. When the input alarm flag is "true" (the "yes" path of step S613), an initial screen image excluding the input component is prepared according to the received display area information of the input component (step S651), an input component image is prepared according to the received display area information of the input component (step S653), a key code is obtained from a local input event and a string containing letters, alphanumeric characters, symbols, or any combination thereof is accordingly obtained (step S655), the initial screen image, the input component image and the string are combined to produce a new screen image (step S657), and the combined screen image is rendered on the display unit 220 (step S631). In steps S651 to S657 and step S631, because the user uses the input device 230 of the desktop computer 130 to input data, the processing unit 210 can regenerate and render a screen image containing the instant input string according to the display area information of the input component to improve the image refresh efficiency. In step S655, the processing unit 210 of the desktop computer 130 may transmit the key code to the mobile phone 110 via a predefined control channel in a wired or wireless communications protocol, thereby enabling the mobile phone 110 to draw a corresponding string in an input component of a screen image. The control channel may be a UIBC (User Input Back Channel). After rendering the screen image on the display unit 220 of the desktop computer 130 (step S631), the processing unit 210 determines whether the screencasting function is deactivated (step S633). When the screencasting function is still activated (the "no" path of step S633), the process continues the next run of operations (step S633); otherwise (the "yes" path of step S633), the process ends. In step S633, the screencasting function is determined to be deactivated when the mobile phone 110 is disconnected from the desktop computer 130 or the screencasting function is closed by the user.

Figure 7:
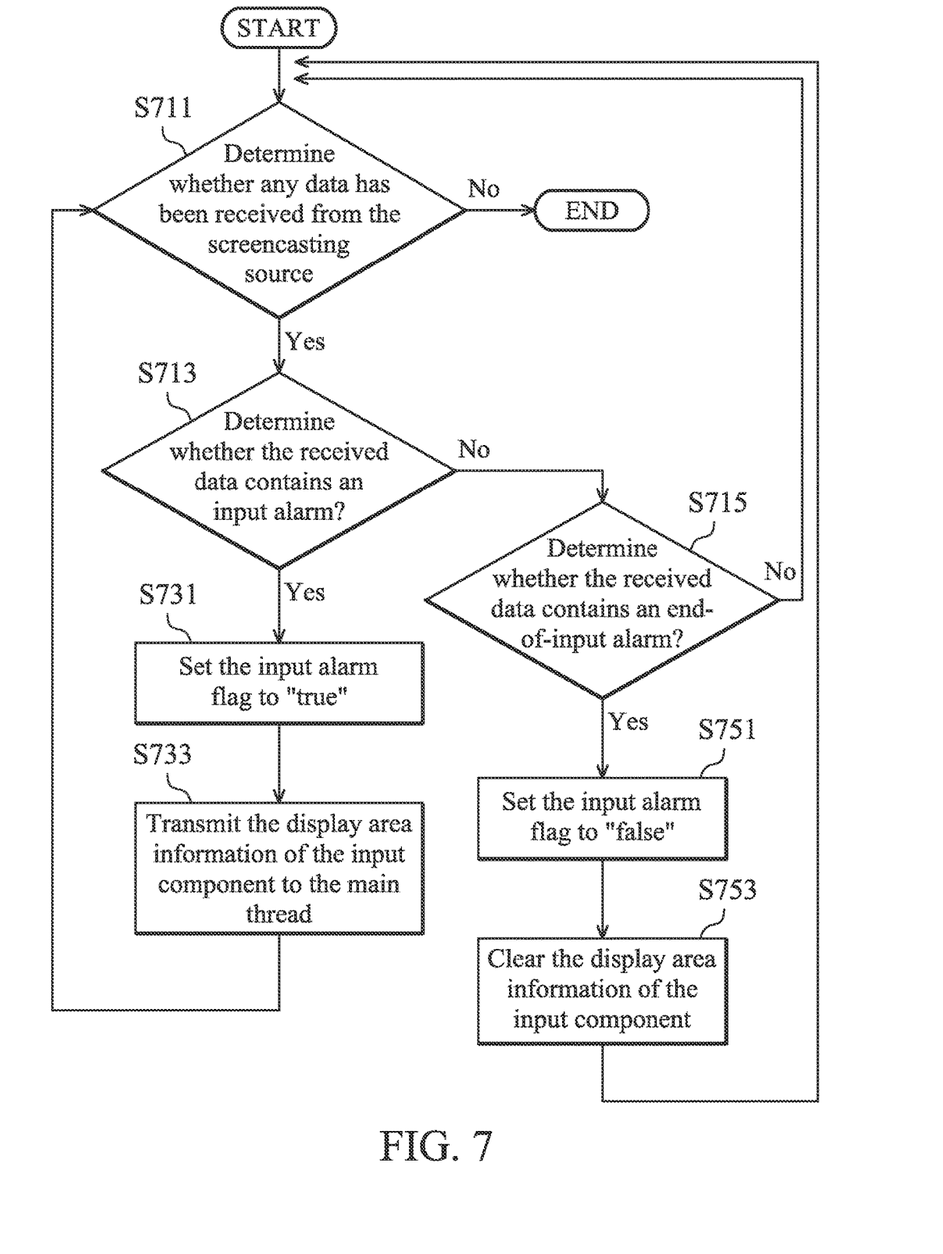
FIG. 7 is a flowchart illustrating a method for receiving input component information, performed by a processing unit of a desktop computer according to an embodiment of the invention.

FIG. 7 is a flowchart illustrating a method for receiving input component information, performed by the processing unit 210 of the desktop computer 130 according to an embodiment of the invention. The method is implemented in an input alarm and data thread of the screencasting receiver, which is created and executed by the processing unit 210 when the application including the input component is initiated. First, the processing unit 210 determines whether any data has been received from the screencasting source (step S711). If so, the process continues with the following operations (steps S713 to S753); otherwise, the whole process ends. Technical details for transmitting data may be referred to in the description of steps S431, S433 and S453. It should be noted that the processing unit 210 of the desktop computer 130 stores the input alarm, the end-of-input alarm and the display area information of the input component, which are received from the mobile phone 110, in the memory 250 or the storage device 240 of the desktop computer 130. It is determined that the data has been received from the screencasting source when the processing unit 210 detects that any of the input alarm, the end-of-input alarm and the display area information of the input component is stored in the memory 250 or the storage device 240.

Subsequently, the processing unit 210 determines whether the received data contains an input alarm (step S713). If so, the input alarm flag is set to "true" (step S731) and the display area information of the input component is transmitted to the main thread (step S733). If the received data does not contain an input alarm (the "no" path of step S713), the processing unit 210 further determines whether the received data contains an end-of-input alarm (step S715). If so, the input alarm flag is set to "false" (step S751) and the display area information of the input component is cleared (step S753); otherwise, the process continues the next run of the determinations (step S711).

Figure 8:
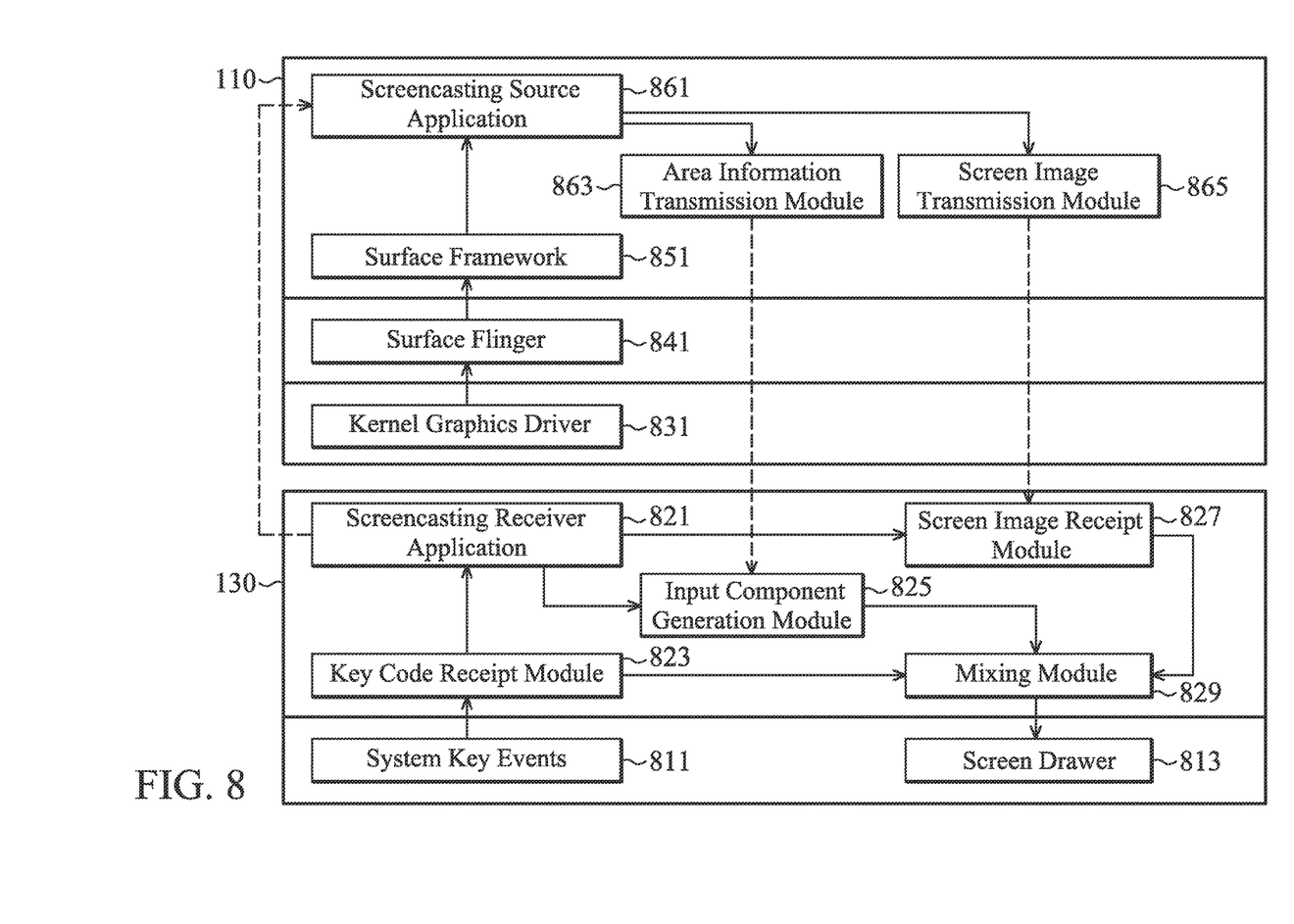
FIG. 8 is a schematic diagram illustrating the software architecture of the screencasting system according to an embodiment of the invention.

FIG. 8 is a schematic diagram illustrating the software architecture of the screencasting system according to an embodiment of the invention. A screencasting source application 861 included in the mobile phone 110 captures a screen image displayed on the display unit 220 of the mobile phone 110 and periodically transmits the screen image to the desktop computer 130. The screencasting source application 861 transmits display area information of an input component to the desktop computer 130 after the user selects the input component of the screen image. The screen image displayed on the display unit 220 of the mobile phone 110 is delivered to a screencasting source application 861 through a kernel graphics driver 831, a surface flinger 841 and a surface framework 851 in a row. The screencasting source application 861 transmits the captured screen image to a screen image receipt module 827 of the desktop computer 130 through a screen image transmission module 865. The screen image transmission module 865 transmits the screen image in a wired or wireless communications protocol by a communications driver driving the communications interface 260. The screencasting source application 861 transmits the display area information of the input component of the screen image to an input component generation module 825 of the desktop computer 130 via an area information transmission module 863. The area information transmission module 863 transmits the display area information in a wired or wireless communications protocol by a communications driver driving the communications interface 260. Details of the screen image, the input component and the display area information of the input component may refer to the description of FIG. 5.

Figure 9:
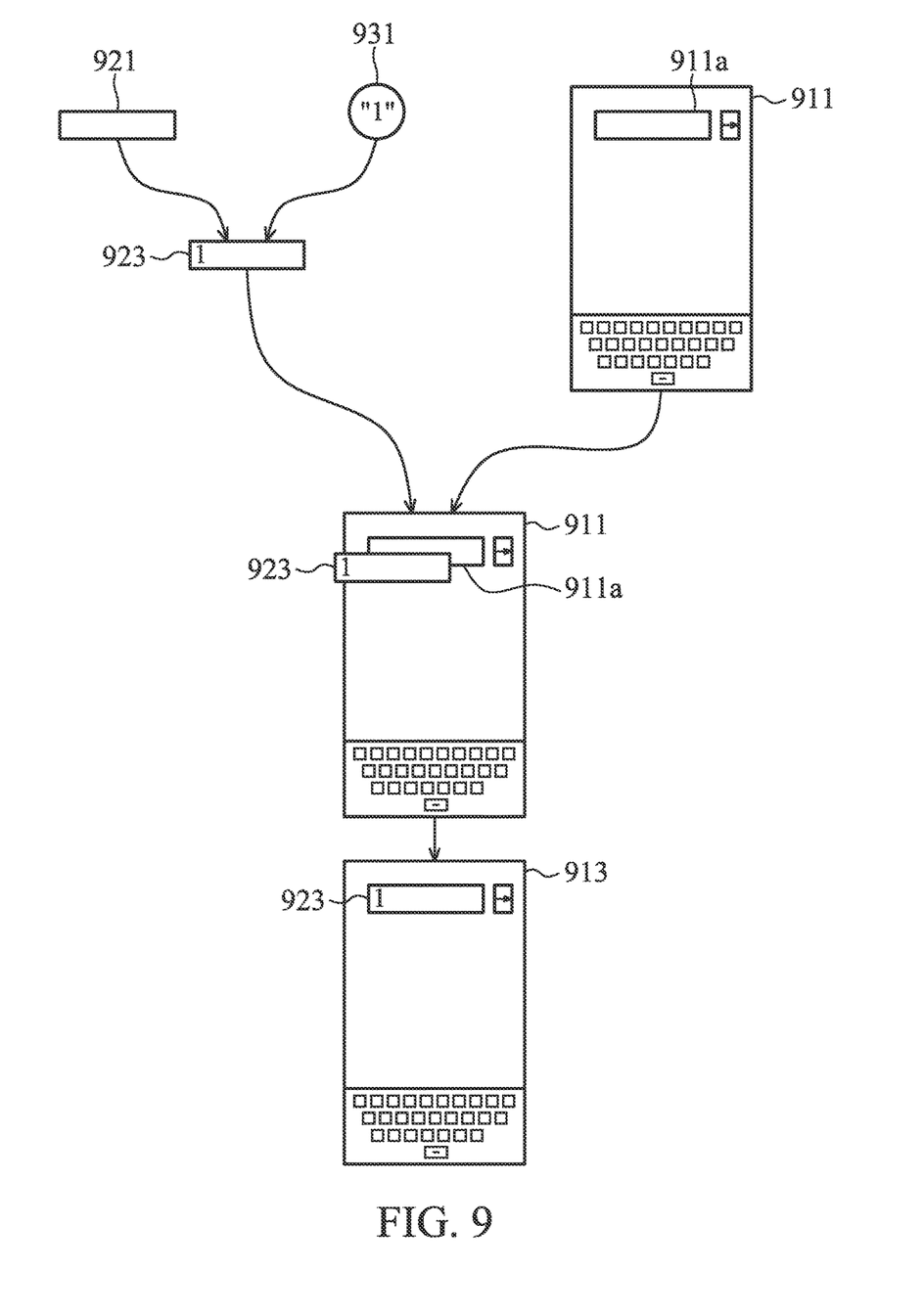
FIG. 9 is a schematic diagram for generating a screen-image according to an embodiment of the invention.

A screencasting receiver application 821 included in the desktop computer 130 coordinates the input component generation module 825 and the screen image receipt module 827 to regenerate a screen image including a string input by a user according to the display area information of the input component sent from the screencasting source, and render the regenerated screen image on the display unit 220 of the desktop computer 130. A key code receipt module 823 subsequently produces a string containing letters, alphanumeric characters, symbols, or any combination thereof according to the received key codes of one or more system key events 811, and transmits the string to both a mixing module 829 and the screencasting receiver application 821. The screencasting receiver application 821 transmits the string to the mobile phone 110 via a predefined channel, such as the UIBC, thereby enabling the processing unit 210 of the mobile phone 110 to update the screen image displayed on the display unit 220 thereof. After obtaining the display area information of the input component from the input component generation module 825, the screen image of the mobile phone 110 from the screen image receipt module 827, and the input string from the key code receipt module 823, the mixing module 829 regenerates the screen image including the input string, and then drives a screen drawer 813 to render the new screen image on the display unit 220 of the desktop computer 130. FIG. 9 is a schematic diagram for generating a screen-image according to an embodiment of the invention. The screen image receipt module 827 transmits a screen image 911 including an input box 911a received from the mobile phone 110 to the mixing module 829. The input component generation module 825 produces an input box 921 according to the display area information of the input component received from the area information transmission module 863, and transmits the produced input box 921 and the display area information of the input component to the mixing module 829. After receiving an input string 931 from the key code receipt module 823, the mixing module 829 pastes the input string 931 on the input box 921 to generate a new input box 923, and then overwrites the input box 911a of the screen image 911 with the new input box 923 to generate a new screen image 913.

Although the embodiment has been described as having specific elements in FIG. 2, it should be noted that additional elements may be included to achieve better performance without departing from the spirit of the invention. While the process flows described in FIGS. 3, 4, 6 and 7 each include a number of operations that appear to occur in a specific order, it should be apparent that these processes can include more or fewer operations, which can be executed in series or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A screencasting method, performed by a processing unit of a screencasting source, comprising:
   after the screencasting source connects to a screencasting receiver, capturing a first screen image displayed on a display unit of the screencasting source and transmitting the first screen image to the screencasting receiver; and
   after detecting that data to be input via a first input component of the first screen image, transmitting the first screen image, display area information of the first input component of the first screen image, and an input alarm to the screencasting receiver to inform the screencasting receiver that data to be input, wherein the display area information of the first input component comprises a position of the first input component, thereby enabling the screencasting receiver to anticipate where the first input component is situated in the first screen image and render a second screen image according to the first screen image and the display area information, wherein the second screen image comprises a second input component comprising an input string received from the screencasting receiver, not from the screencasting source;
   wherein an initial screen image excluding the first input component is prepared by the screencasting receiver according to the display area information of the first input component in response to the screencasting receiver receives the input alarm, and the initial screen image, the second input component and the input string are combined to produce the second screen image;
   wherein the screencasting receiver regenerates and renders an updated image containing an instant input string received from the screencasting receiver according to the display area information of the first input component.

2. The screencasting method of claim 1, wherein the display area information comprises a start coordinate, a width and a height of the first input component.

3. The screencasting method of claim 2, comprising:
after detecting that a data input has been completed, transmitting an end-of-input alarm to indicate the screencasting receiver that the user has completed the data input.

4. A screencasting method, performed by a processing unit of a screencasting receiver, after a screencasting source connects to a screencasting receiver, comprising:
receiving a first screen image displayed on a display unit of the screencasting source;
after receiving an input alarm from the screencasting source, which indicates that data to be input, receiving the first screen image displayed on the display unit of the screencasting source, and display area information of a first input component of the first screen image from the screencasting source, wherein the display area information is used to anticipate where the first input component is situated in the first screen image;
preparing a second input component according to the display area information; wherein an initial screen image excluding the first input component is prepared by the screencasting receiver according to the display area information in response to the screencasting receiver receives the input alarm;
obtaining an input string, with an input device of the screencasting receiver, not from the screencasting source;
combining the input string into the second input component;
combining the second input component into the initial screen image to generate a second screen image according to the display area information;
rendering the second screen image on a display unit of the screencasting receiver; and
regenerating and rendering an updated image containing an instant input string received from the input device according to the display area information of the first input component.

5. The screencasting method of claim 4, further comprising:
after the screencasting receiver receives an end-of-input alarm, receiving the first screen image displayed on the display unit of the screencasting source from the screencasting source, and displaying the first screen image on the display unit of the screencasting receiver.

6. The screencasting method of claim 4, further comprising:
transmitting the input string to the screencasting source, thereby enabling the screencasting source to update the first screen image on the display unit of the screencasting source.

7. The screencasting method of claim 6, wherein the input string is transmitted to the screencasting source via a UIBC (User Input Back Channel).

8. A screencasting system, comprising:
a screencasting source, comprising;
a display unit displaying a first screen image; and
a first processing unit, after the screencasting source connects to a screencasting receiver, capturing the first screen image and transmitting the first screen image to the screencasting receiver; after detecting that data to be input via a first input component of the first screen image, transmitting the first screen image, and display area information of the first input component of the first screen image, and an input alarm to the screencasting receiver to inform the screencasting receiver that data to be input, wherein the display area information of the first input component comprises a position of the first input component, thereby enabling the screencasting receiver to anticipate where the first input component is situated in the first screen image and render a second screen image according to the first screen image and the display area information, wherein the second screen image comprises a second input component comprising an input string received from the screencasting receiver, not from the screencasting source;
wherein an initial screen image excluding the first input component is prepared by the screencasting receiver according to the display area information of the first input component in response to the screencasting receiver receives the input alarm, and the initial screen image, the second input component and the input string are combined to produce the second screen image;
wherein the screencasting receiver regenerates and renders an updated image containing an instant input string received from the screencasting receiver according to the display area information of the first input component.

9. The screencasting system of claim 8, wherein the display area information comprises a start coordinate, a width and a height of the first input component.

10. The screencasting system of claim 9, wherein the first processing unit, after detecting that a data input has been completed, transmits an end-of-input alarm to inform the screencasting receiver that the user has completed the data input.

11. The screencasting system of claim 9, further comprising:
the screencasting receiver, comprising;
a display unit;
an input device; and
a second processing unit, receiving the first screen image displayed on the display unit of the screencasting source, and display area information of a first input component of the first screen image from the screencasting source; preparing a second input component according to the display area information; obtaining an input string with the input device; combining the input string into the second input component; combining the second input component into the first screen image to generate a second screen image according to the display area information; and rendering the second screen image on the display unit of the screencasting receiver.

12. The screencasting system of claim 11, wherein after the screencasting receiver receives the input alarm, the second processing unit further performs operations for obtaining the input string, generating the second input component, generating the second screen image and displaying the second screen image.

13. The screencasting system of claim 12, wherein after the screencasting receiver receives an end-of-input alarm, the second processing unit further receives the first screen image displayed on the display unit of the screencasting source from the screencasting source, and displays the first screen image on the display unit of the screencasting receiver.

14. The screencasting system of claim 13, wherein the second processing unit transmits the input string to the screencasting source, thereby enabling the screencasting source to update the first screen image on the display unit of the screencasting source.

15. The screencasting system of claim 14, wherein the input string is transmitted to the screencasting source via a UIBC (User Input Back Channel).

16. A screencasting apparatus, operating as a screencasting receiver, comprising:
- a display unit;
- an input device; and
- a processing unit, after the screencasting receiver connects to a screencasting source, receiving a first screen image displayed on a display unit of the screencasting source; after receiving an input alarm from the screencasting source, which indicates that data to be input, receiving the first screen image displayed on the display unit of the screencasting source, and display area information of a first input component of the first screen image from the screencasting source, wherein the display area information is used to anticipate where the first input component is situated in the first screen image; preparing a second input component according to the display area information; obtaining an input string with the input device, not from the screencasting source; combining the string into the second input component; combining the second input component into an initial screen image to generate a second screen image according to the display area information; and rendering the second screen image on the display unit of the screencasting receiver;

wherein the initial screen image excluding the first input component is prepared by the screencasting receiver according to the display area information of the first input component in response to the screencasting receiver receives the input alarm, and the initial screen image, the second input component and the input string are combined to produce the second screen image;

regenerating and rendering an updated image containing an instant input string received from the input device according to the display area information of the first input component.

17. The screencasting apparatus of claim 16, wherein the processing unit, after the screencasting source connects to the screencasting receiver and the screencasting receiver receives an end-of-input alarm, further receives the first screen image displayed on the display unit of the screencasting source from the screencasting source, and displays the first screen image on the display unit of the screencasting receiver.

18. The screencasting apparatus of claim 17, wherein the processing unit transmits the input string to the screencasting source, thereby enabling the screencasting source to update the first screen image on the display unit of the screencasting source.

* * * * *